United States Patent
Christensen (10) Patent No.: US 11,560,874 B2
(45) Date of Patent: Jan. 24, 2023

(54) METHOD FOR DETERMINING A YAW POSITION OFFSET OF A WIND TURBINE

(71) Applicant: VESTAS WIND SYSTEMS A/S, Aarhus N (DK)

(72) Inventor: Brian Melgaard Christensen, Skanderborg (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 1178 days.

(21) Appl. No.: 16/074,309

(22) PCT Filed: Mar. 1, 2017

(86) PCT No.: PCT/DK2017/050056
§ 371 (c)(1),
(2) Date: Jul. 31, 2018

(87) PCT Pub. No.: WO2017/148485
PCT Pub. Date: Sep. 8, 2017

(65) Prior Publication Data
US 2021/0180566 A1      Jun. 17, 2021

(30) Foreign Application Priority Data
Mar. 3, 2016   (DK) .............................. PA201670127

(51) Int. Cl.
*F03D 7/04* (2006.01)
*F03D 7/02* (2006.01)
*F03D 17/00* (2016.01)

(52) U.S. Cl.
CPC ........... *F03D 7/048* (2013.01); *F03D 7/0204* (2013.01); *F03D 17/00* (2016.05);
(Continued)

(58) Field of Classification Search
CPC ........ F03D 7/048; F03D 7/0204; F03D 17/00; F05B 2260/821; F05B 2270/204;
(Continued)

(56) References Cited

U.S. PATENT DOCUMENTS

2014/0037447 A1* 2/2014 Attia ....................... F03D 17/00
416/9
2014/0219795 A1   8/2014 Honhoff et al.
(Continued)

FOREIGN PATENT DOCUMENTS

CN     103994022 A    8/2014
CN     105041570 A    11/2015
(Continued)

OTHER PUBLICATIONS

Intellectual Property India Examination Report for Application No. 201817026930 dated Mar. 15, 2021.
(Continued)

*Primary Examiner* — Christopher Verdier
(74) *Attorney, Agent, or Firm* — Patterson + Sheridan, LLP (57) ABSTRACT

A method for determining a yaw position offset of a wind turbine (1) is provided. A neighbouring wind turbine (2) of the wind farm is identified, the neighbouring wind turbine (2) being arranged in the vicinity of the wind turbine (1). Produced power data and/or wind speed data from the wind turbine (1) and from the neighbouring wind turbine (2), is obtained during a period of time, and a yaw position offset of the wind turbine (1) is derived, based on the obtained produced power data and/or wind speed data, and based on the geographical positions of the wind turbine (1) and the neighbouring wind turbine (2). A local maximum and a local minimum being separated by an angular difference in yaw position being substantially equal to 180°.

8 Claims, 2 Drawing Sheets

(52) U.S. Cl.
CPC ..... *F05B 2260/821* (2013.01); *F05B 2270/32* (2013.01); *F05B 2270/321* (2013.01); *F05B 2270/329* (2013.01); *F05B 2270/335* (2013.01); *F05B 2270/802* (2013.01)

(58) Field of Classification Search
CPC .......... F05B 2270/321; F05B 2270/329; F05B 2270/335; F05B 2270/802
See application file for complete search history.

(56) References Cited

U.S. PATENT DOCUMENTS

| | | | |
|---|---|---|---|
| 2014/0234103 A1 | 8/2014 | Obrecht | |
| 2015/0086357 A1 | 3/2015 | Gregg | |
| 2015/0308416 A1* | 10/2015 | Ambekar | F03D 17/00 700/287 |
| 2015/0345476 A1* | 12/2015 | Gregg | F03D 17/00 702/92 |
| 2018/0135595 A1* | 5/2018 | Chen | F03D 7/0204 |

FOREIGN PATENT DOCUMENTS

| | | | |
|---|---|---|---|
| CN | 105041572 A | 11/2015 | |
| CN | 105298748 A | 2/2016 | |
| EP | 2599993 A1 * | 6/2013 | ............ F03D 17/00 |
| EP | 2631471 A1 | 8/2013 | |
| EP | 2949924 A1 | 12/2015 | |
| WO | 2017148485 A1 | 9/2017 | |

OTHER PUBLICATIONS

Chinese Office Action for Application No. 201780014267.8 dated Jun. 5, 2019.
Danish Patent and Trademark First Technical Examination for Application No. PA 2016 70127 dated Oct. 14, 2016.
Notification of Transmittal of The International Search Report and The Written Opinion of the International Searching Authority, or the Declaration for Application No. PCT/DK2017/050056 dated Jul. 6, 2017.

* cited by examiner

METHOD FOR DETERMINING A YAW POSITION OFFSET OF A WIND TURBINE

FIELD OF THE INVENTION

The present invention relates to a method for determining a yaw position offset of a wind turbine, with respect to absolute geographical directions. The yaw position of the wind turbine may further be corrected in order to eliminate the yaw position offset. Furthermore, the invention provides a controller being capable of performing the method.

BACKGROUND OF THE INVENTION

It is sometimes relevant to determine the absolute orientation of a nacelle of a wind turbine, and thereby the orientation of a rotor carried by the nacelle, relative to a specific landmark or geographic orientation. For instance, this may be needed in order to perform sector management control with respect to wind direction. Furthermore, the control of a given wind turbine may be adjusted in accordance with wake effects, etc., caused by adjacent wind turbines, vegetation, landscape, etc., and it is therefore desirable to know when such obstacles are arranged in the wind direction relative to the wind turbine.

It is known to calibrate the yaw system of a wind turbine with respect to absolute geographical directions in a manual manner. For instance, the geographical direction 'North' may be identified by means of a compass, and this direction may be used as a reference direction, and the yaw angle may be set to zero when the nacelle is directed in this direction. As an alternative, a direction towards a specific landmark may be used as a reference direction, and the yaw angle may be set to zero when the nacelle is directed towards the landmark. Such manual calibration of the yaw system is relatively inaccurate, and there is a considerable risk of introducing manual errors.

EP 2 599 993 A1 discloses a method to determine the yaw angle of a component of a wind turbine. At least one receiver of an automated and autonomous positioning system is used to generate position data of the receiver. The receiver is arranged at a wind turbine location being subjected to a yawing movement. The position data of the receiver is used to generate a first reference axis, defining an actual orientation of the component in reference to a geographical direction. A second reference axis defines an orientation of the component in reference to a predefined landmark or in reference to a predefined geographical direction. The first reference axis and the second reference axis meet at a common point of intersection. The angle between the first and the second reference axis is determined as yaw angle of the component.

EP 2 949 924 A1 discloses a computer-implemented method for recalibrating nacelle-positions of a plurality of wind turbines in a wind park. The method includes identifying at least two associated wind turbines included within the wind park wherein each associated wind turbine includes location information. A plurality of predicted wake features for the associated wind turbines are determined, based at least partially on the location information of each associated wind turbine. A plurality of historical performance data related to the associated wind turbines are retrieved, and a plurality of current wake features are determined, based on the plurality of historical performance data. A variance between the predicted wake features and the current wake features is determined, and a recalibration factor for at least one of the associated wind turbines is determined, based on the identified variance.

DESCRIPTION OF THE INVENTION

It is an object of embodiments of the invention to provide a method for determining a yaw position offset which allows the yaw position offset to be easily determined in an accurate manner.

It is a further object of embodiments of the invention to provide a method for determining a yaw position offset which allows the yaw position offset to be determined without requiring additional equipment or sensors.

According to a first aspect the invention provides a method for determining a yaw position offset of a wind turbine, the wind turbine comprising a tower and a nacelle attached rotatably on the tower, and the wind turbine being arranged in a wind farm, the method comprising the steps of:
 identifying a neighbouring wind turbine of the wind farm, said neighbouring wind turbine being arranged in the vicinity of the wind turbine,
 obtaining produced power data from the wind turbine and from the neighbouring wind turbine, during a period of time,
 based on the obtained produced power data, obtaining data relating to produced power ratio or produced power difference between the produced power of the wind turbine and produced power of the neighbouring wind turbine, as a function of yaw position of the wind turbine, said yaw position being provided by the wind turbine,
 analysing the produced power ratio data or produced power difference data and identifying a local maximum and a local minimum in the produced power ratio or power difference being separated by an angular difference in yaw position being substantially equal to 180°, and identifying yaw positions corresponding to the local maximum and the local minimum, said local maximum arising from the neighbouring wind turbine being arranged directly in the wake of the wind turbine, and said local minimum arising from the wind turbine being arranged directly in the wake of the neighbouring wind turbine, and
 deriving a yaw position offset of the wind turbine, based on the analysis step and based on the geographical positions of the wind turbine and the neighbouring wind turbine.

The method of the first aspect of the invention relates to determining a yaw position offset of a wind turbine comprising a tower and a nacelle attached rotatably on the tower. The rotating movements of the nacelle relative to the tower are normally referred to as yawing movements, and the angular position of the nacelle is normally referred to as a yaw position.

The wind turbine is arranged in a wind farm. In the present context the term 'wind farm' should be interpreted to mean a group of wind turbines, arranged within a site, i.e. a well defined geographical area. The wind farm may be arranged on-shore or off-shore. The wind turbines of a wind farm are sometimes at least partly controlled dependently of each other. Wind farms are also sometimes referred to as 'wind power plants' or 'wind parks'.

According to the method of the first aspect of the invention, a neighbouring wind turbine of the wind farm is initially identified. Thus, the neighbouring wind turbine is also arranged in the wind farm in which the wind turbine is arranged. Furthermore, the neighbouring wind turbine is arranged in the vicinity of the wind turbine. Accordingly, it can be expected that operation of the wind turbine may be affected by the operation, or even the mere presence, of the neighbouring wind turbine, and vice versa.

Once the neighbouring wind turbine has been identified, produced power data is obtained from the wind turbine and from the neighbouring wind turbine, during a period of time.

In the present context the term 'produced power data' should be interpreted to mean data which relates to the electrical power produced by the respective wind turbines. Accordingly, during this step of the method, data is obtained regarding the power production provided by the wind turbine as well as provided by the neighbouring wind turbine, during a specified period of time. Accordingly, correlated produced power data is obtained from the two wind turbines, and such data must be expected to include information regarding how the power production of each wind turbine is affected by the other wind turbine.

Next, data relating to produced power ratio or produced power difference between the produced power of the wind turbine and produced power of the neighbouring wind turbine are obtained, based on the obtained produced power data, and as a function of yaw position of the wind turbine.

The produced power ratio data or produced power difference data are then analysed and a local maximum and a local minimum in the produced power ratio or power difference are identified, the local maximum and the local minimum being separated by an angular difference in yaw position being substantially equal to 180°. Furthermore, yaw positions corresponding to the local maximum and the local minimum are identified.

In the case that the data being obtained and analysed relate to produced power ratio between the produced power of the wind turbine and produced power of the neighbouring wind turbine, the following applies. When the neighbouring wind turbine is arranged directly in the wake of the wind turbine, the power production of the wind turbine will not be affected by the neighbouring wind turbine at all. However, the power production of the neighbouring wind turbine will be affected by the wind turbine to a maximum extent. Thus, when this occurs, the ratio between the power produced by the wind turbine and the power produced by the neighbouring wind turbine can be expected to be at a local maximum.

Similarly, when the wind turbine is arranged directly in the wake of the neighbouring wind turbine, the power production of the wind turbine will be affected by the neighbouring wind turbine to a maximum extent, while the power production of the neighbouring wind turbine will not be affected by the wind turbine at all. Thus, when this occurs, the ratio between the power produced by the wind turbine and the power produced by the neighbouring wind turbine can be expected to be at a local minimum.

In the case that the data being obtained and analysed relate to produced power difference between the produced power of the wind turbine and produced power of the neighbouring wind turbine, similar remarks regarding the local maximum and the local minimum apply. However, in this case, instead of deriving produced power ratio from the obtained produced power data, produced power difference between the produced power of the wind turbine and produced power of the neighbouring wind turbine is obtained. It should be noted that, in the present context, the produced power difference is not an absolute value, but may be positive as well as negative, depending on which wind turbine is arranged in the wake of the other.

Similarly to the remarks set forth above, the produced power difference will be positive, and at a maximum value, when the neighbouring wind turbine is arranged directly in the wake of the wind turbine, and the produced power difference will be negative, and at a minimum value, when the wind turbine is arranged directly in the wake of the neighbouring wind turbine.

The identified local maximum and local minimum are separated by an angular difference in yaw position which is substantially equal to 180°. A yaw position in which the neighbouring wind turbine is arranged directly in the wake of the wind turbine must necessarily be separated from a yaw position in which the wind turbine is arranged directly in the wake of the neighbouring wind turbine by an angular difference of 180°. Therefore, a maximum/minimum pair in the produced power ratio data or the produced power difference data, which is separated by an angular difference of 180° is a suitable candidate for these two yaw positions. Since there will most likely be further wind turbines arranged in the vicinity of the wind turbine and the neighbouring wind turbine, and since there may also be other obstacles in the region, other yaw positions may result in local maxima or minima in the produced power ratio. It is therefore necessary to identify the correct maximum and minimum, which are actually caused by the wind turbine and the neighbouring wind turbine being arranged in the wake of each other. Accordingly, it is an advantage of the invention that a maximum/minimum pair being separated by an angular difference of approximately 180° is identified.

Finally, a yaw position offset of the wind turbine is derived, based on the analysis step and based on the geographical positions of the wind turbine and the neighbouring wind turbine. Thus, the yaw position offset of the wind turbine is derived based on information which can be extracted from the obtained produced power data, and on the maximum/minimum pair being separated by an angular difference of approximately 180°.

Furthermore, knowledge regarding the geographical positions of the wind turbine and the neighbouring wind turbine, and thereby the relative position of the two wind turbines, is taken into account. For instance, the geographical positions of the wind turbines provides information regarding at which wind directions one of the wind turbines will be arranged directly in the wake of the other wind turbine, and the operation of one of the wind turbines is therefore affected to a maximum extent by the other wind turbine. Such effects may be derivable from the obtained produced power data. Since the yaw system of a wind turbine is normally operated to ensure that the rotor of the wind turbine is directed towards the incoming wind, the yaw position of a wind turbine indicates the wind direction. Accordingly, comparing the yaw positions at which the effects described above occur to the known geographical positions of the wind turbine and the neighbouring wind turbine will reveal whether or not, and by which amount, the yaw position of the wind turbine is offset with respect to absolute geographical directions.

Since the geographical positions of the wind turbines are normally known very precisely, the yaw position offset can be determined in a very accurate manner. Furthermore, the yaw position offset is derived solely based on measurements which are already performed and used during operation of the wind turbines, and determining the yaw position offset therefore requires no additional sensors or measurements.

The method may further comprise the step of:
  deriving absolute yaw positions of the wind turbine corresponding to the neighbouring wind turbine being arranged directly in the wake of the wind turbine and corresponding to the wind turbine being arranged directly in the wake of the neighbouring wind turbine, and the step of deriving a yaw position offset may comprise comparing the identified yaw positions to the derived absolute yaw positions.

According to this embodiment, absolute yaw positions, which are known to cause one of the wind turbines to be arranged directly in the wake of the other wind turbine, are derived. These absolute yaw positions are then compared to the yaw positions which were derived from the analysis of the produced power ratio data. A difference between the derived absolute yaw positions and the yaw positions identified by the analysis of the produced power ratio data, will correspond to a yaw position offset of the yaw positions of the wind turbine.

The step of deriving absolute yaw positions of the wind turbine may further be based on the geographical positions of the wind turbine and the neighbouring wind turbine.

According to this embodiment, the accurately known geographical positions of the wind turbine and the neighbouring wind turbine are used for determining the absolute yaw positions where one of the wind turbines is arranged directly in the wake of the other wind turbine. This provides a very accurate determination of the absolute yaw positions, and thereby a very accurate determination of the yaw position offset of the wind turbine.

The method may further comprise the steps of:
identifying a further neighbouring wind turbine of the wind farm, said further neighbouring wind turbine being arranged in the vicinity of the wind turbine,
obtaining produced power data from the wind turbine and from the further neighbouring wind turbine, during a period of time, and
deriving a yaw position offset of the wind turbine, based on the obtained produced power data and based on the geographical positions of the wind turbine and the further neighbouring wind turbine.

According to this embodiment, the method steps are repeated, using another neighbouring wind turbine, in order to obtain a more accurate value for the yaw position offset of the wind turbine. Even further neighbouring wind turbines may subsequently be used, thereby even further increasing the accuracy of the derived yaw position offset.

The method may further comprise the step of deriving a resulting yaw position offset of the wind turbine, based on the derived yaw position offset based on produced power data obtained from the neighbouring wind turbine as well as on the derived yaw position offset based on produced power data obtained from the further neighbouring wind turbine.

According to this embodiment, the resulting yaw position offset is based on yaw position offsets derived independently from measurements performed by means of two different neighbouring wind turbines. Thereby any systematic errors related to the neighbouring wind turbines can be eliminated, and a more accurate value for the yaw position offset of the wind turbine is obtained.

The step of obtaining produced power data may be performed while the wind turbine and/or the neighbouring wind turbine is/are operated in a partial load region. In the present context the term 'partial load region' should be interpreted to mean that the wind turbine is operated at wind speeds between a cut-in wind speed, corresponding to a minimum wind speed at which the wind turbine produces power, and a nominal wind speed, corresponding to the lowest wind speed at which the wind turbine reaches its nominal power production.

At wind speeds above the nominal wind speed, the wind turbine is normally operated in such a manner that the power production of the wind turbine is substantially equal to the nominal power production. Accordingly, when the wind turbine is operated in this region, the power production does not change when the wind speed changes. However, when at least one of the wind turbine and the neighbouring wind turbine is operated in the partial load region, the power production will change when the wind speed changes, and thereby changes in the produced power data due to wake effects can be detected.

The method may further comprise the step of correcting the yaw positions provided by the wind turbine in order to eliminate the derived yaw position offset.

According to this embodiment, the derived yaw position offset of the wind turbine is used for the purpose of correcting the yaw positions provided by the wind turbine. Thereby the yaw system of the wind turbine is 'calibrated' relative to the absolute yaw positions, and subsequently the yaw positions provided by the wind turbine will be aligned with the absolute, geographical yaw positions.

According to a second aspect the invention provides a controller for controlling at least one wind turbine comprising a tower and a nacelle attached rotatably on the tower, the wind turbine(s) being arranged in a wind farm, the controller being configured to perform the steps of:
obtaining produced power data from a wind turbine and from a neighbouring wind turbine, during a period of time, said neighbouring wind turbine being arranged in the vicinity of the wind turbine,
based on the obtained produced power data, obtaining data relating to produced power ratio or produced power difference between the produced power of the wind turbine and produced power of the neighbouring wind turbine, as a function of yaw position of the wind turbine, said yaw position being provided by the wind turbine,
analysing the produced power ratio data or produced power difference data and identifying a local maximum and a local minimum in the produced power ratio or power difference being separated by an angular difference in yaw position being substantially equal to 180°, and identifying yaw positions corresponding to the local maximum and the local minimum, said local maximum arising from the neighbouring wind turbine being arranged directly in the wake of the wind turbine, and said local minimum arising from the wind turbine being arranged directly in the wake of the neighbouring wind turbine, and
deriving a yaw position offset of the wind turbine, based on the analysis step and based on the geographical positions of the wind turbine and the neighbouring wind turbine.

Thus, the controller according to the second aspect of the invention is configured to perform the method according to the first aspect of the invention. A person skilled in the art would therefore readily recognise that any feature described in combination with the first aspect of the invention could also be combined with the second aspect of the invention, and vice versa, and that the remarks set forth above are therefore equally applicable here.

The controller according to the second aspect of the invention may be arranged to control one wind turbine. In this case the controller may be arranged in that wind turbine. As an alternative, the controller may be arranged to control two or more wind turbines. For instance, the controller may be or form part of a control unit arranged to control a wind farm. Finally, the controller may be a dedicated unit, arranged solely for performing the method according to the first aspect of the invention.

Thus, the invention further provides a wind turbine comprising a tower and a nacelle attached rotatably on the tower, the wind turbine further comprising a controller according to the second aspect of the invention.

Furthermore, the invention provides a wind farm comprising at least two wind turbines, each wind turbine comprising a tower and a nacelle attached rotatably on the tower, the wind farm further comprising a controller according to the second aspect of the invention.

According to a third aspect the invention provides a method for determining a yaw position offset of a wind turbine, the wind turbine comprising a tower and a nacelle attached rotatably on the tower, and the wind turbine being arranged in a wind farm, the method comprising the steps of:
- identifying a neighbouring wind turbine of the wind farm, said neighbouring wind turbine being arranged in the vicinity of the wind turbine,
- obtaining wind speed data at the wind turbine and at the neighbouring wind turbine, during a period of time,
- based on the obtained wind speed data, obtaining data relating to wind speed ratio between the wind speed at the wind turbine and wind speed at the neighbouring wind turbine, as a function of yaw position of the wind turbine, said yaw position being provided by the wind turbine,
- analysing the wind speed ratio data and identifying a local maximum and a local minimum in the wind speed ratio being separated by an angular difference being substantially equal to 180°, and identifying yaw positions corresponding to the local maximum and the local minimum, said local maximum arising from the neighbouring wind turbine being arranged directly in the wake of the wind turbine, and said local minimum arising from the wind turbine being arranged directly in the wake of the neighbouring wind turbine, and
- deriving a yaw position offset of the wind turbine, based on the analysis step and based on the geographical positions of the wind turbine and the neighbouring wind turbine.

The method according to the third aspect of the invention is very similar to the method according to the first aspect of the invention, and the remarks set forth above with reference to the first aspect of the invention are therefore equally applicable here.

However, in the method according to the third aspect of the invention, wind speed data is obtained at the wind turbine and the neighbouring wind turbine, respectively, instead of produced power data. However, the wind speeds measured or estimated at the wind turbine and the neighbouring wind turbine will be affected in essentially the same manner as the produced power by the mutual wake effects introduced by the two wind turbines. Thus, when the wind turbine is arranged directly in the wake of the neighbouring wind turbine, the wind speed at the wind turbine will be reduced to a maximum extent by the wake introduced by the neighbouring wind turbine, while the wind speed at the neighbouring wind turbine will not be affected by the wind turbine at all. Similarly, when the neighbouring wind turbine is arranged directly in the wake of the wind turbine, the wind speed at the neighbouring wind turbine will be reduced to a maximum extent by the wake introduced by the wind turbine, while the wind speed at the wind turbine will not be affected by the neighbouring wind turbine at all. Therefore, analysing the wind speeds in a similar manner to the analysis of the produced power described above with reference to the first aspect of the invention, will allow similar conclusions to be drawn, and thereby a yaw position offset of the wind turbine can be derived from the obtained wind speed data.

In the present context the term 'wind speed data' should be interpreted to mean data which relates to the wind speed prevailing at the positions of the wind turbine and the neighbouring wind turbine, respectively. The wind speed data may, e.g., be measured wind speed data, obtained by means of a wind speed sensor, such as an anemometer, mounted on the relevant wind turbine, or arranged at a position near the relevant wind turbine. As an alternative, the wind speed data may be an estimated wind speed, e.g. in the form of a corrected measured wind speed, in which known effects, e.g. caused by the rotor of the wind turbine, are taken into account.

The method may further comprise the step of:
- deriving absolute yaw positions of the wind turbine corresponding to the neighbouring wind turbine being arranged directly in the wake of the wind turbine and corresponding to the wind turbine being arranged directly in the wake of the neighbouring wind turbine, and the step of deriving a yaw position offset may comprise comparing the identified yaw positions to the derived absolute yaw positions, preferably based on the geographical positions of the wind turbine and the neighbouring wind turbine.

This is also very similar to the corresponding embodiment of the method according to the first aspect of the invention, and the remarks set forth above are therefore equally applicable here.

According to a fourth aspect the invention provides a controller for controlling at least one wind turbine comprising a tower and a nacelle attached rotatably on the tower, the wind turbine(s) being arranged in a wind farm, the controller being configured to perform the steps of:
- obtaining wind speed data from a wind turbine and from a neighbouring wind turbine, during a period of time, said neighbouring wind turbine being arranged in the vicinity of the wind turbine,
- based on the obtained wind speed data, obtaining data relating to wind speed ratio between the wind speed at the wind turbine and wind speed at the neighbouring wind turbine, as a function of yaw position of the wind turbine, said yaw position being provided by the wind turbine,
- analysing the wind speed ratio data and identifying a local maximum and a local minimum in the wind speed ratio being separated by an angular difference being substantially equal to 180°, and identifying yaw positions corresponding to the local maximum and the local minimum, said local maximum arising from the neighbouring wind turbine being arranged directly in the wake of the wind turbine, and said local minimum arising from the wind turbine being arranged directly in the wake of the neighbouring wind turbine, and
- deriving a yaw position offset of the wind turbine, based on the analysis step and based on the geographical positions of the wind turbine and the neighbouring wind turbine.

Thus, the controller according to the fourth aspect of the invention is configured to perform the method according to the third aspect of the invention. This is very similar to the corresponding embodiment of the controller according to the second aspect of the invention. A person skilled in the art would therefore readily recognise, as described above, that any feature described in combination with the first, second and third aspect of the invention could also be combined with the fourth aspect.

BRIEF DESCRIPTION OF THE DRAWINGS

The invention will now be described in further detail with reference to the accompanying drawings in which.

DETAILED DESCRIPTION OF THE DRAWINGS

Figure 1:
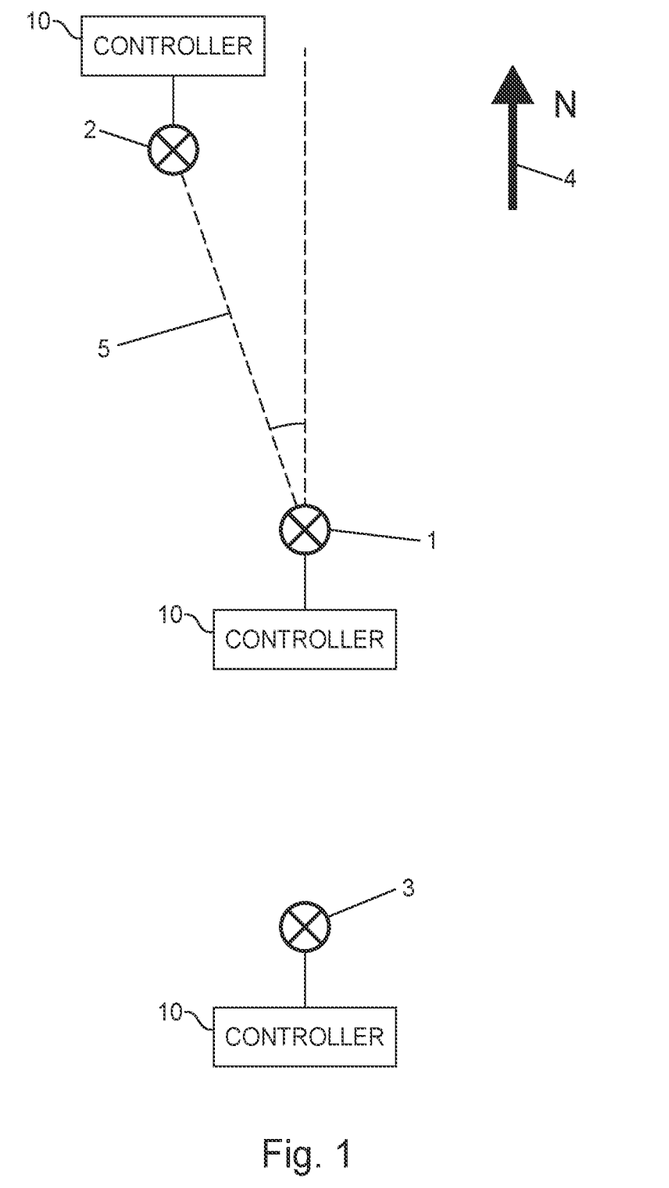
FIG. 1 illustrates relative geographical positions of three wind turbines of a wind farm.

FIG. 1 illustrates relative geographical positions of three wind turbines 1, 2, 3, the wind turbines 1, 2, 3 being arranged in a wind farm. The geographical direction 'North' is indicated by arrow 4. The wind farm may include a number of further wind turbines, which are not shown in FIG. 1.

Each of the wind turbines 1, 2, 3 comprises a tower and a nacelle attached rotatably on the tower, via a yaw system, the nacelle carrying a rotor. As discussed above, each of the wind turbines 1, 2, 3 also includes a controller 10 that controls the operation of the wind turbines 1, 2, 3. The yaw system of a wind turbine 1, 2, 3 allows the nacelle of the wind turbine to be rotated to a position in which the rotor is directed into the incoming wind. The yaw systems of the wind turbines 1, 2, 3 are initially aligned with geographical directions, e.g. in a manual manner. For instance, this may be done using a compass and/or one or more landmarks, as described above. Such manual alignment of yaw systems is relatively inaccurate, and it may therefore be desirable to correct or adjust the yaw positions provided by a given wind turbine 1, 2, 3 in order to eliminate a yaw position offset between the yaw positions provided by the wind turbine 1, 2, 3 and absolute, geographical yaw positions, the yaw position offset being caused by the inaccuracy of the initial alignment of the yaw system.

Accordingly, a yaw position offset of the wind turbine 1 can be determined by means of a method according an embodiment of the invention. To this end, a neighbouring wind turbine 2 is identified. It can be seen from FIG. 1 that the neighbouring wind turbine 2 is arranged in the vicinity of the wind turbine 1, and it may therefore be expected that operation of the wind turbine may be affected by the neighbouring wind turbine, and vice versa.

The geographical positions of the wind turbine 1 and the neighbouring wind turbine 2 are known very accurately. Accordingly, the direction of the line 5 interconnecting the wind turbine 1 and the neighbouring wind turbine 2, e.g. with respect to North 4, is also known in an accurate manner.

When the wind direction is such that the neighbouring wind turbine 2 is arranged directly in the wake of the wind turbine 1, the power production of the neighbouring wind turbine 2 is affected to the maximum extent by the wind turbine 1, and the power production of the wind turbine 1 is not affected at all by the neighbouring wind turbine 2.

Similarly, when the wind direction is such that the wind turbine 1 is arranged directly in the wake of the neighbouring wind turbine 2, the power production of the wind turbine 1 is affected to the maximum extent by the neighbouring wind turbine 2, and the power production of the neighbouring wind turbine 2 is not affected at all by the wind turbine 1.

The two wind directions described above are separated by an angular difference of 180°, and they correspond to wind direction being parallel to the line 5, in a direction from the wind turbine 1 towards the neighbouring wind turbine 2, and in a direction from the neighbouring wind turbine 2 towards the wind turbine 1, respectively.

Since the wind turbine 1 is arranged to direct the rotor into the incoming wind, the wind direction is reflected by the yaw position of the wind turbine 1. Thus, according to the method of the invention, produced power data is obtained from the wind turbine 1 and from the neighbouring wind turbine 2, as a function of the yaw position provided by the wind turbine. Performing appropriate analysis of the obtained produced power data, allows the impact of the wake effects described above to be detected. Furthermore, the yaw positions at which these effects occur can be identified. The identified yaw positions are then compared to the absolute yaw positions, where it is expected that the wake effects occur. The absolute yaw positions can be derived from accurate knowledge of the geographical positions of the wind turbine 1 and the neighbouring wind turbine 2.

The comparison may reveal that the yaw positions provided by the wind turbine 1, based on the initial, inaccurate alignment of the yaw system, are offset relative to the absolute yaw positions. Once such an offset has been determined, the yaw positions of the wind turbine 1 can be corrected in such a manner that the yaw position offset is eliminated.

Furthermore, the method described above may be repeated, using a further neighbouring wind turbine 3 instead of the neighbouring wind turbine 2. Thereby a more accurate value for the yaw position offset of the wind turbine 1 can be obtained.

Figure 2:
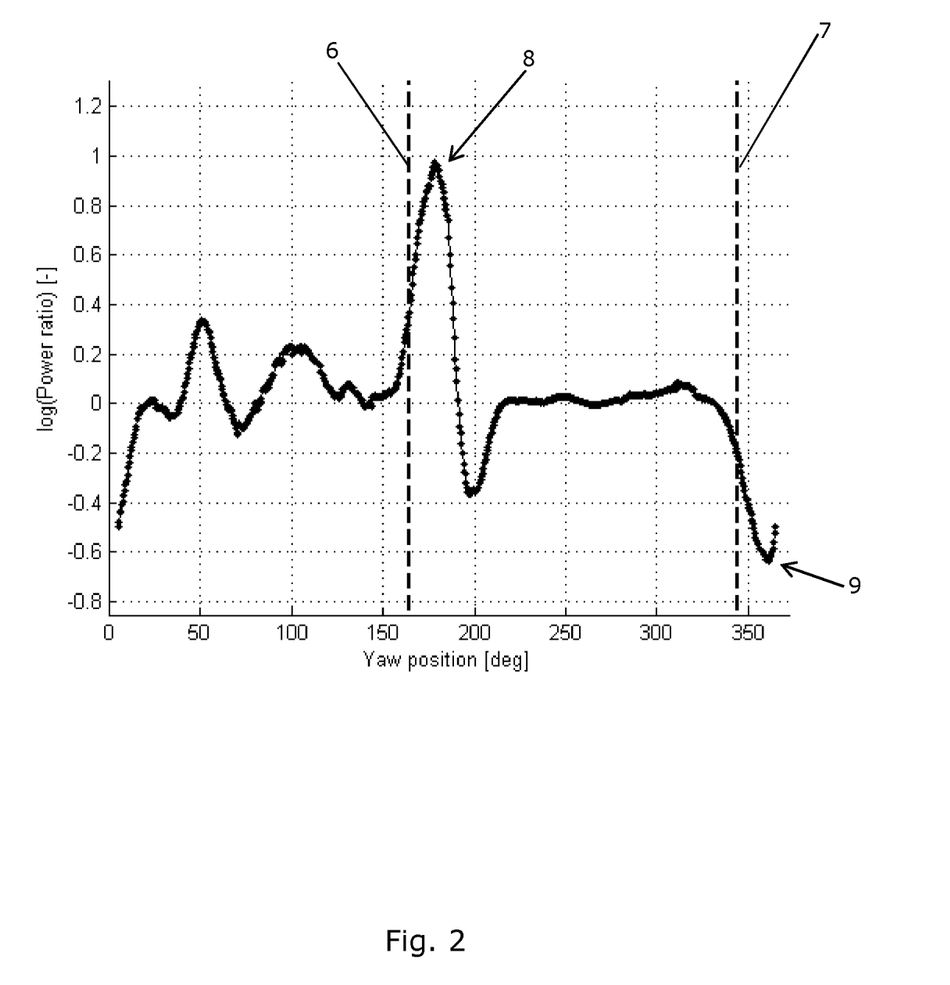
FIG. 2 is a graph illustrating produced power ratio between produced power of a wind turbine and a neighbouring wind turbine, as a function of yaw position of the wind turbine.

FIG. 2 is a graph illustrating produced power ratio between produced power of a wind turbine and a neighbouring wind turbine, as a function of yaw position of the wind turbine. The wind turbines could, e.g., be the wind turbine 1 and the neighbouring wind turbine 2 of FIG. 1.

Yaw position 6 corresponds to a yaw position at which the neighbouring wind turbine is expected to be arranged directly in the wake of the wind turbine, based on the known geographical positions of the wind turbine and the neighbouring wind turbine. Similarly, yaw position 7 corresponds to a yaw position at which the wind turbine is expected to be arranged directly in the wake of the neighbouring wind turbine. It is noted that yaw position 6 and yaw position 7 are separated by 180°.

When the neighbouring wind turbine is arranged directly in the wake of the wind turbine, the ratio between the produced power of the wind turbine and the produced power of the neighbouring wind turbine is expected to be at a local maximum. Similarly, when the wind turbine is arranged directly in the wake of the neighbouring wind turbine, the ratio between the produced power of the wind turbine and the produced power of the neighbouring wind turbine is expected to be at a local minimum.

The graph of FIG. 2 exhibits a local maximum 8 and a local minimum 9 separated by 180° and at yaw positions close to the yaw positions 6 and 7. However, the local maximum 8 and the local minimum 9 are not exactly coinciding with the yaw positions 6 and 7. Instead, the local maximum 8 and the local minimum 9 are both shifted upwards by approximately the same amount. This shifted amount defines a difference between the yaw positions provided by the wind turbine and the absolute yaw positions, based on geographical positions of the wind turbines. Accordingly, the shifted amount corresponds to a yaw position offset of the wind turbine.

It should be noted that, in the embodiments illustrated in FIGS. 1 and 2, wind speeds at the wind turbine and the neighbouring wind turbine, respectively, may be obtained and analysed instead of produced power data.

The invention claimed is:

1. A method for determining a yaw position offset of a wind turbine, the wind turbine comprising a tower and a nacelle attached rotatably on the tower, and the wind turbine being arranged in a wind farm, the method comprising:
    identifying a neighbouring wind turbine of the wind farm, said neighbouring wind turbine being arranged in the vicinity of the wind turbine,
    obtaining first produced power data from the wind turbine and from the neighbouring wind turbine, during a period of time,
    based on the obtained first produced power data, obtaining, as a function of yaw position of the wind turbine, data relating to a produced power ratio or a produced power difference between a produced power of the wind turbine and a produced power of the neighbouring wind turbine, said yaw position being provided by the wind turbine,
    analyzing the data relating to the produced power ratio or the data relating to the produced power difference and identifying a local maximum and a local minimum in the produced power ratio or the produced power difference, the local maximum and the local minimum being separated by an angular difference in yaw position of 180°;
    identifying yaw positions corresponding to the local maximum and the local minimum, said local maximum arising from the neighbouring wind turbine being arranged directly in a wake of the wind turbine, and said local minimum arising from the wind turbine being arranged directly in a wake of the neighbouring wind turbine;
    deriving a first yaw position offset of the wind turbine, based on the analyzing step and based on geographical positions of the wind turbine and the neighbouring wind turbine; and
    adjusting the yaw position of the wind turbine based on the first yaw position offset.

2. The method according to claim 1, further comprising deriving absolute yaw positions of the wind turbine corresponding to the neighbouring wind turbine being arranged directly in the wake of the wind turbine and corresponding to the wind turbine being arranged directly in the wake of the neighbouring wind turbine, wherein deriving a yaw position offset comprises comparing the identified yaw positions to the derived absolute yaw positions, based on the geographical positions of the wind turbine and the neighbouring wind turbine.

3. The method according to claim 1, further comprising:
    identifying a further neighbouring wind turbine of the wind farm, said further neighbouring wind turbine being arranged in the vicinity of the wind turbine, and
    obtaining second produced power data from the wind turbine and from the further neighbouring wind turbine, during a period of time, and
    deriving a second yaw position offset of the wind turbine, based on the second produced power data and based on geographical positions of the wind turbine and the further neighbouring wind turbine.

4. The method according to claim 3, further comprising deriving a resulting yaw position offset of the wind turbine, based on the first yaw position offset and the second yaw position offset.

5. The method according to claim 1, wherein the first produced power data is obtained while at least one of the wind turbine or the neighbouring wind turbine is operated in a partial load region.

6. The method according to claim 1, further comprising correcting the yaw positions provided by the wind turbine to eliminate the derived first yaw position offset.

7. A controller for controlling at least one wind turbine comprising a tower and a nacelle attached rotatably on the tower, the at least one wind turbine being arranged in a wind farm, the controller being configured to:
    obtain first produced power data from a wind turbine and from a neighbouring wind turbine, during a period of time, said neighbouring wind turbine being arranged in the vicinity of the wind turbine,
    based on the obtained first produced power data, obtain, as a function of yaw position of the wind turbine, data relating to a produced power ratio or a produced power difference between a produced power of the wind turbine and a produced power of the neighbouring wind turbine, said yaw position being provided by the wind turbine,
    analyze the data relating to the produced power ratio or the data relating to the produced power difference and identify a local maximum and a local minimum in the produced power ratio or the produced power difference, the local maximum and the local minimum being separated by an angular difference in yaw position of 180°;
    identify yaw positions corresponding to the local maximum and the local minimum, said local maximum arising from the neighbouring wind turbine being arranged directly in a wake of the wind turbine, and said local minimum arising from the wind turbine being arranged directly in a wake of the neighbouring wind turbine;
    derive a first yaw position offset of the wind turbine, based on the analyzing step and based on geographical positions of the wind turbine and the neighbouring wind turbine; and
    adjust the yaw position of the wind turbine based on the first yaw position offset.

8. A wind turbine comprising a tower and a nacelle attached rotatably on the tower, the wind turbine further comprising a controller for the wind turbine, the controller being configured to:
    obtain first produced power data from a wind turbine and from a neighbouring wind turbine, during a period of time, said neighbouring wind turbine being arranged in the vicinity of the wind turbine,
    based on the obtained first produced power data, obtaining, as a function of yaw position of the wind turbine, data relating to a produced power ratio or a produced power difference between the produced power of the wind turbine and the produced power of the neighbouring wind turbine, said yaw position being provided by the wind turbine,
    analyze the data relating to the produced power ratio or the data relating to the produced power difference and identify a local maximum and a local minimum in the produced power ratio or the produced power difference, the local maximum and the local minimum being separated by an angular difference in yaw position of 180°;

identify yaw positions corresponding to the local maximum and the local minimum, said local maximum arising from the neighbouring wind turbine being arranged directly in a wake of the wind turbine, and said local minimum arising from the wind turbine being arranged directly in a wake of the neighbouring wind turbine;

derive a yaw position offset of the wind turbine, based on the analyzing step and based on geographical positions of the wind turbine and the neighbouring wind turbine; and adjust the yaw position of the wind turbine based on the first yaw position offset.

* * * * *